US011613870B2

(12) United States Patent
Walker et al.

(10) Patent No.: US 11,613,870 B2
(45) Date of Patent: Mar. 28, 2023

(54) APPARATUS FOR LOCATING ELONGATE OBJECT IN A TRENCH IN A FLOOR OF A BODY OF WATER

(71) Applicant: Soil Machine Dynamics Limited, Wallsend (GB)

(72) Inventors: John Graeme Walker, Wallsend (GB); Roger Paul White, Wallsend (GB)

(73) Assignee: Soil Machine Dynamics Limited, Wallsend (GB)

( * ) Notice: Subject to any disclaimer, the term of this patent is extended or adjusted under 35 U.S.C. 154(b) by 0 days.

(21) Appl. No.: 17/111,277

(22) Filed: Dec. 3, 2020

(65) Prior Publication Data

US 2021/0172151 A1 Jun. 10, 2021

(30) Foreign Application Priority Data

Dec. 5, 2019 (EP) .................................... 19213813

(51) Int. Cl.
*F16L 1/12* (2006.01)
*E02F 5/10* (2006.01)
*E02F 5/14* (2006.01)

(52) U.S. Cl.
CPC .............. *E02F 5/105* (2013.01); *E02F 5/107* (2013.01); *E02F 5/109* (2013.01); *E02F 5/14* (2013.01)

(58) Field of Classification Search
CPC ... E02F 5/105; E02F 5/14; E02F 5/109; E02F 5/107; E02F 5/104; E02F 5/106; E02F 3/925; E02F 5/108; E02F 3/88; E02F 3/9206; E02F 3/92; E02F 3/8858; E02F 3/9218; E02F 9/06; E02F 3/9212; E02F 3/9262; E02F 3/8891; E02F 5/025; E02F 5/06; E02F 5/287; F16L 1/12; F16L 1/26
See application file for complete search history.

(56) References Cited

U.S. PATENT DOCUMENTS 2,048,710 A * 7/1936 Ranney ................... E21B 7/003
37/351
2,136,911 A 11/1938 Briscoe
RE20,990 E 1/1939 Wright
2,849,809 A 9/1958 Chattin
(Continued)

FOREIGN PATENT DOCUMENTS

DE 19542689 C1 4/1997
EP 0296783 A1 12/1988
(Continued)

OTHER PUBLICATIONS

European Patent Office, Extended Search Report, Application No. 20164557.9, dated Nov. 19, 2020, 12 pages.
(Continued)

*Primary Examiner* — Edwin J Toledo-Duran
(74) *Attorney, Agent, or Firm* — Quarles & Brady LLP

(57) ABSTRACT

An apparatus for locating an elongate object in the seabed is disclosed. The apparatus comprises a body and a pair of jetting swords arranged on lateral sides of the elongate object to form a trench in the seabed. Chain cutters arranged on lateral sides of the elongate object cut respective parts of a trench in the seabed and are moveable relative to the body between a stowed position and a deployed position, independently of the jetting swords.

15 Claims, 7 Drawing Sheets

(56) References Cited

U.S. PATENT DOCUMENTS

| | | | | |
|---|---|---|---|---|
| 3,238,734 A * | 3/1966 | Rhodes | ............. | E02F 5/107 37/332 |
| 3,333,432 A * | 8/1967 | Hale | ............. | E02F 5/107 405/164 |
| 3,434,297 A * | 3/1969 | Spollen | ............. | E02F 5/105 405/160 |
| 3,462,963 A | 8/1969 | Moore | | |
| 3,526,047 A | 9/1970 | Roessler et al. | | |
| 3,590,589 A * | 7/1971 | Smulders | ............. | E02F 5/105 405/161 |
| 3,627,372 A | 12/1971 | Carpenter et al. | | |
| 3,670,514 A * | 6/1972 | Breston | ............. | E02F 5/105 405/160 |
| 3,722,224 A * | 3/1973 | Roy | ............. | E02F 5/104 405/163 |
| 3,751,927 A * | 8/1973 | Perot, Jr. | ............. | E02F 5/107 405/162 |
| 3,877,237 A * | 4/1975 | Norman | ............. | E02F 5/105 405/160 |
| 3,897,639 A | 8/1975 | Hansen | | |
| 3,990,377 A * | 11/1976 | Marquinez | ............. | E02F 5/106 405/161 |
| 4,022,028 A * | 5/1977 | Martin | ............. | E02F 3/9206 37/330 |
| 4,091,629 A * | 5/1978 | Gunn | ............. | G02B 6/4465 405/181 |
| 4,124,991 A | 11/1978 | Adler | | |
| 4,301,606 A * | 11/1981 | Hofmeester | ............. | E02F 5/108 37/329 |
| 4,410,297 A * | 10/1983 | Lynch | ............. | E02F 5/104 405/181 |
| 4,585,372 A | 4/1986 | Grinstead et al. | | |
| 4,586,850 A * | 5/1986 | Norman | ............. | E02F 5/105 405/160 |
| 4,714,378 A * | 12/1987 | Lincoln | ............. | E02F 5/104 405/161 |
| 4,714,379 A * | 12/1987 | Gilchrist, Jr. | ............. | E02F 5/06 405/166 |
| 4,721,409 A * | 1/1988 | Harmstorf | ............. | E02F 3/10 405/163 |
| 4,749,308 A * | 6/1988 | Izawa | ............. | E02F 3/8858 405/161 |
| 4,802,793 A | 2/1989 | Grinsted et al. | | |
| 4,812,079 A * | 3/1989 | Johnson | ............. | E02F 5/104 405/164 |
| 4,877,355 A * | 10/1989 | Van Pelt | ............. | E02F 5/107 405/158 |
| 5,349,765 A * | 9/1994 | Kitanaka | ............. | E02F 3/142 37/356 |
| 5,626,438 A | 5/1997 | Etheridge | | |
| 5,659,983 A * | 8/1997 | Coutarel | ............. | E02F 5/12 405/163 |
| 6,189,244 B1 * | 2/2001 | Johnson | ............. | E02F 5/14 405/181 |
| 6,719,494 B1 * | 4/2004 | Machin | ............. | E02F 5/107 405/160 |
| 8,939,678 B2 * | 1/2015 | Lazzarin | ............. | E02F 5/04 405/161 |
| 9,605,407 B2 | 3/2017 | Penner | | |
| 10,323,383 B2 | 6/2019 | Wilson | | |
| 10,711,432 B2 | 7/2020 | White et al. | | |
| 10,947,695 B2 * | 3/2021 | Lu | ............. | E02F 5/109 |
| 2002/0017041 A1 * | 2/2002 | Gloppen | ............. | E02F 5/006 37/344 |
| 2007/0253780 A1 * | 11/2007 | Pihl | ............. | E02F 5/109 405/184 |
| 2010/0095560 A1 * | 4/2010 | Grinsted | ............. | E02F 5/104 37/352 |
| 2011/0211913 A1 * | 9/2011 | Lazzarin | ............. | E02F 5/109 405/163 |
| 2014/0150303 A1 | 6/2014 | Wilson | | |
| 2014/0154014 A1 | 6/2014 | Wilson | | |
| 2014/0283421 A1 * | 9/2014 | Manchester | ............. | E02F 5/104 37/309 |
| 2014/0345171 A1 * | 11/2014 | Manchester | ............. | E02F 5/06 37/352 |
| 2016/0215476 A1 * | 7/2016 | Walker | ............. | E21B 41/04 |
| 2018/0216314 A1 * | 8/2018 | Bonel | ............. | E02F 5/145 |
| 2020/0165796 A1 * | 5/2020 | Manchester | ............. | E02F 3/9218 |
| 2020/0318314 A1 * | 10/2020 | Lu | ............. | E02F 5/106 |
| 2021/0010230 A1 * | 1/2021 | Haddorp | ............. | E02F 3/8858 |

FOREIGN PATENT DOCUMENTS

| | | | |
|---|---|---|---|
| EP | 0543467 A1 | 5/1993 | |
| EP | 2787126 A1 | 10/2014 | |
| EP | 2840187 A1 | 2/2015 | |
| EP | 3121917 A1 | 1/2017 | |
| EP | 3499662 A1 | 6/2019 | |
| GB | 2172032 A | 9/1986 | |
| GB | 2212536 A | 7/1989 | |
| GB | 2355276 A | 4/2001 | |
| GB | 2545925 A | 7/2017 | |
| KR | 20120065024 A | 6/2012 | |
| RU | 2010139625 A | 4/2012 | |
| WO | 9954556 A1 | 10/1999 | |
| WO | WO-9954556 A1 * | 10/1999 | ............. E02F 5/14 |
| WO | 0149947 A1 | 7/2001 | |
| WO | 0175236 A1 | 10/2001 | |
| WO | 2009141409 A2 | 11/2009 | |
| WO | 2013167910 A1 | 11/2013 | |
| WO | 2014161984 A1 | 10/2014 | |
| WO | 2015032730 A1 | 3/2015 | |
| WO | 2017017599 A1 | 2/2017 | |
| WO | 2021094193 A1 | 5/2021 | |

OTHER PUBLICATIONS

Danish Patent and Trademark Office, Search Report and Opinion, Application No. PA201870577, dated Jul. 12, 2019, 9 pages.

PCT International Search Report and Written Opinion, PCT/EP2017/054300, dated May 11, 2017, 12 pages.

European Patent Office, Extended Search Report, Application No. 19213813.9, dated May 18, 2020, 9 pages.

PCT International Search Report and Written Opinion, PCT/EP2020/075803, dated Feb. 23, 2021, 14 pages.

European Patent Office, Extended Search Report, Application No. 21182054.3, dated Dec. 22, 2021, 7 pages.

European Patent Office, Partial Search Report, Application No. 22181186.2, dated Nov. 21, 2022, 13 pages.

* cited by examiner

APPARATUS FOR LOCATING ELONGATE OBJECT IN A TRENCH IN A FLOOR OF A BODY OF WATER

CROSS-REFERENCE TO RELATED APPLICATIONS

This application claims priority to European Patent Application No. 19213813.9 filed Dec. 5, 2019, the disclosure of which is incorporated herein by reference in its entirety and for all purposes.

STATEMENT CONCERNING FEDERALLY SPONSORED RESEARCH OR DEVELOPMENT

Not applicable.

FIELD OF THE INVENTION

The present disclosure generally relates to an apparatus for locating an elongate object in a trench in a floor of a body of water, and relates particularly, but not exclusively, to an apparatus for burying a flexible power cable or flexible or rigid pipeline in the seabed.

BACKGROUND OF THE INVENTION

It is known to protect flexible and rigid elongate structures, for example power cables, telecommunication cables, umbilicals, and pipelines, extending across a subsea seabed surface, from damage as a result of accidental contact with marine traffic activities and/or from natural hazards, by burying such structures to a predetermined depth below the seabed surface.

Burial of such products is commonly planned along a predetermined route, the trajectory of which is primarily determined by minimizing length and avoiding marine traffic hazards, natural hazards, geophysical hazards, and/or undesirable topography. Commonly, the geotechnical risk of the route associated with the seabed ground conditions is a secondary parameter of the route planning process, thereby leading to a requirement for subsea trenching equipment to be adaptable to changes in ground conditions, such as geology type and soil characteristics.

Subsea trenching equipment, such as a trenching remotely operated vehicle (ROV) or tractor, has conventionally been used to provide a channel in the seabed in which the product can be buried. Such trenching equipment generally utilizes a number of different ground engaging tools which are specified and deployed to work in a particular geology type or characteristic, i.e. sand, clay, or rock seabed. Each tool has its optimum working conditions as a balance between product burial productivity, operating/maintenance costs, and complexity of product manipulation. As a result, it is common to deploy multiple subsea trenching machines, with different tooling, to the seabed in order to complete the burial of the product along the complete route, or for subsea trenching machines to have multiple integral tooling systems to enable adaptability to the ground conditions. This latter arrangement is typically complex, expensive and can impose additional risk of damage to the product during its manipulation and/or burial.

Generally, very soft/loose to firm/dense soil conditions allow for the deployment of hydromechanical tools such as a water jetting system housed within ground engaging swords. This tooling arrangement has a simple product manipulation system, very few moving parts, and can achieve relatively high burial production rates.

For stiff/very dense soils to hard/cemented rock conditions, it is necessary to deploy mechanical tools such as chain cutters or wheel cutters. These tooling arrangements have complex product manipulation systems, high maintenance costs, and achieve relatively low burial production rates. In particular, in the case of chain cutters, a greater chain speed enables a larger amount of material to be cut, but also increases the rate of wear of the cutting teeth, thereby limiting productivity.

WO 2014/161984 discloses an arrangement in which a "V" shaped trench is cut by means of a pair of chain cutters, and the chain cutters are provided with jet outlets for enabling liquid jets to be directed at uncut seabed material located between a pipe and a trench to assist in breaking up the uncut seabed material. However, this arrangement suffers from the drawback that it is not suitable for burying flexible objects such as cables, because of the risk of the cable coming into contact with the chain cutters, and removal of the apparatus from the pipe is complicated in the case of failure of the apparatus.

SUMMARY OF THE INVENTION

Preferred embodiments of the present disclosure seek to increase productivity of burying products across routes with diverse seabed ground conditions.

According to one aspect of the present disclosure, there is provided an apparatus for locating an elongate object in a trench in a floor of a body of water, the apparatus comprising:— a body;

a first trench forming device comprising a respective first jetting device adapted to be arranged on each lateral side of an elongate object and to direct at least one respective jet of liquid to at least partially form a trench in a floor of a body of water; and a second trench forming device comprising a respective mechanical cutting device adapted to be arranged on each lateral side of the elongate object and to cut a respective part of a trench in the floor of the body of water, wherein the second trench forming device is moveable relative to the body between a stowed position and a deployed position, independently of the first trench forming device.

By providing a second trench forming device comprising a respective mechanical cutting device adapted to be arranged on each lateral side of the elongate object and to cut a respective part of a trench in the floor of the body of water, wherein the second trench forming device is moveable relative to the body between a stowed position and a deployed position, independently of the first trench forming device, this provides the advantage of improving the productivity of the first trench cutting device while also enabling the apparatus to be easily removed from the elongate object in the event of failure of the apparatus. The advantage is also provided of improving productivity of the apparatus by reducing drag caused by the second trench forming device when it is not required.

The second trench forming device may include at least one second jetting device adapted to direct at least one respective jet of liquid at material of the floor of the body of water located between the respective parts of said trench formed by the second trench forming device.

This provides the advantage of assisting breaking up of the floor material by enabling liquid jets to be directed at the unsupported floor material between the respective parts of the trench, therefore improving productivity of the first trench forming device. The further advantage is provided of improving transport of material of the floor of the body of water behind the first trench cutting device, to thereby more effectively locate the product at the bottom of the trench.

The apparatus may further comprise a guard device adapted to be located between the second trench forming device and the elongate object for preventing the elongate object from coming into contact with the second trench forming device.

The guard device may include at least one aperture to enable at least one said second jetting device to direct at least one jet of liquid through said aperture at material of the floor of the body of water located between the respective parts of the trench formed by the second trench forming device.

The second trench forming device may be pivotable between the stowed and deployed positions.

This provides the advantage of enabling the second trenching device to be located in a range of positions relative to the body, thereby enabling the second trench forming device to be used during initial formation of a trench.

The first trench forming device may include a pressing portion for pressing the elongate object to the trench.

The first trench forming device may be moveable relative to the body between a stowed position and a deployed position.

This provides the advantage of enabling the apparatus to be more compact when being deployed from a vessel to the floor of the body of water.

The second trench forming device may be pivotable between the stowed and deployed positions.

This provides the advantage of enabling the first trench forming device to operate over a range of positions, thereby enabling its use during initial formation of the trench.

At least one said first jetting device may have a plurality of inlets, and a respective plurality of outlets in fluid communication with each said inlet.

This provides the advantage of enabling the relative pressures of various pluralities of outlets to be selected.

The total cross sectional area of the outlets for each said plurality of outlets may be substantially equal.

The cross sectional area of each said outlet and the number of said outlets may be substantially equal for each said plurality of outlets.

This provides the advantage of enabling a substantially uniform jetting pressure to be provided.

At least one said mechanical cutting device may comprise at least one chain cutter.

At least one said mechanical cutting device may comprise at least one wheel cutter.

At least one said mechanical cutting device may be located forwardly, in a direction of travel of the apparatus, of at least one said jetting device when in use.

The apparatus may further comprise a load transferring device for transferring loads transverse to the direction of travel between the first trench cutting device and the corresponding said second trench cutting device.

BRIEF DESCRIPTION OF THE DRAWINGS

A preferred embodiment of the disclosure will now be described, by way of example only and not in any limitative sense, with reference to the accompanying drawings, in which.

DETAILED DESCRIPTION OF THE PREFERRED EMBODIMENT

The following discussion is presented to enable a person skilled in the art to make and use embodiments of the invention. Given the benefit of this disclosure, various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

Figure 1:
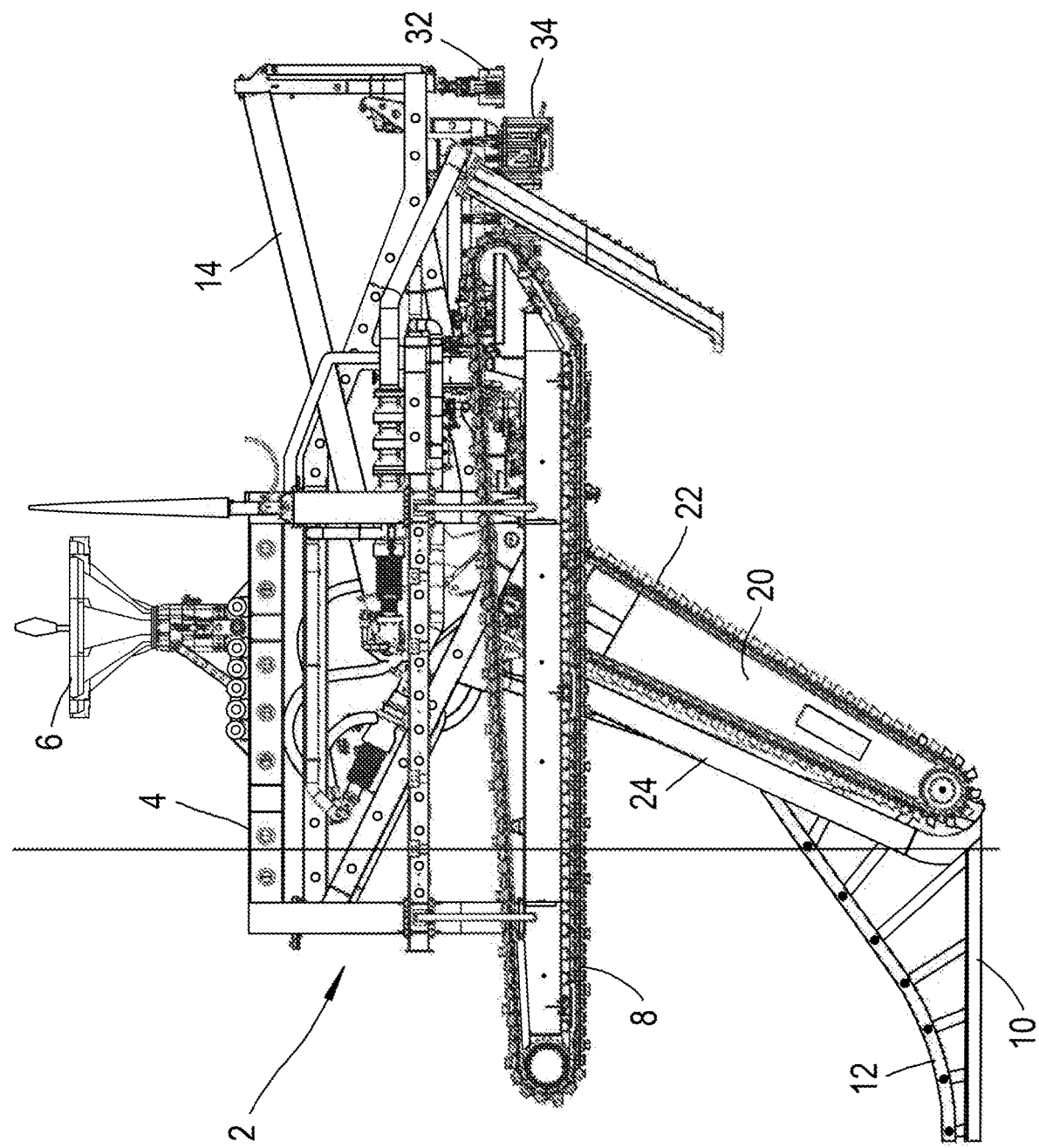
FIG. 1 shows a side view of a subsea trenching apparatus of an embodiment of the present disclosure having first trench forming device and second trench forming device thereof deployed.
Figure 2:
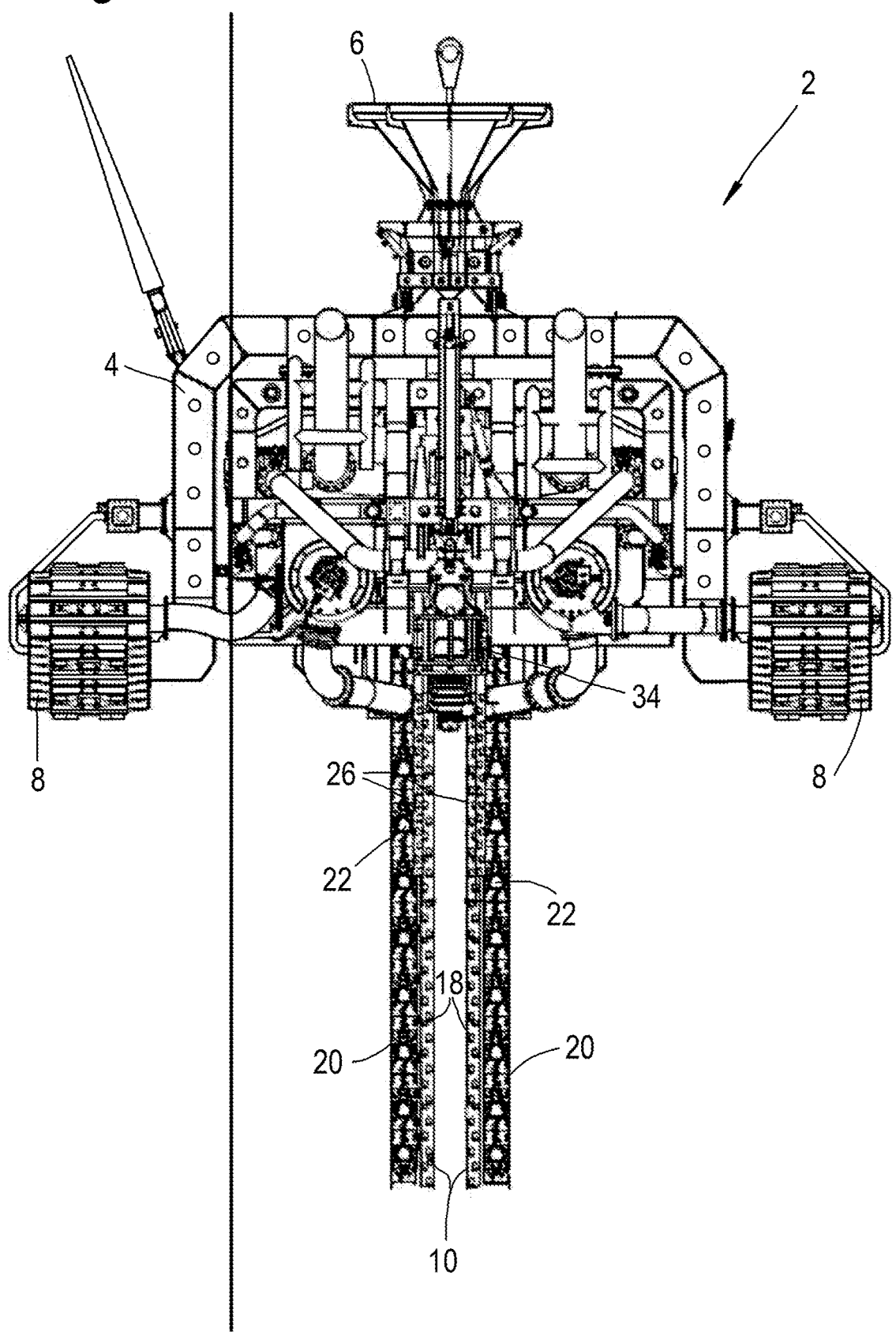
FIG. 2 is a front view of the apparatus of FIG. 1.

Referring to FIGS. 1 and 2, a subsea trenching apparatus 2 embodying the present disclosure has a body 4 and a suspension arrangement 6 for enabling the apparatus 2 to be lowered to the seabed from a vessel. A pair of tracks 8 is mounted to the body 4 to enable the apparatus 2 to move along the seabed, and first trench forming means in the form of a first jetting device includes a pair of jetting swords 10, with one of the jetting swords 10 arranged on each lateral side of an elongate object, such as a cable to be buried in a trench in the seabed, and is pivotably mounted to the body 4. The first trench forming means also includes a depressor 12 for pushing the elongate object to the bottom of the trench after the trench is formed.

The jetting swords 10 of the first jetting device are supplied with water from a surface feed hose 14, and each jetting sword 10 has a plurality of water pipes 16 having a plurality of jetting outlets 18 for directing jets of water forwardly to at least partially form a trench in the sea bed. The cross sectional area of each jetting outlet 18 and the number of jetting outlets 18 for each water pipe 16 is approximately the same, to ensure that substantially uniform pressure is delivered by each jetting outlet 18.

A second trench cutting means in the form of a pair of chain cutters 20 is provided. The chain cutters 20 have teeth 22 mounted on chains and provided with guards 24 and are pivotably mounted relative to the body 4 so that they are moveable between a stowed position (FIGS. 3 and 4) and a deployed position (FIGS. 1, 2 and 5 to 7). The chain cutters 20 are provided on opposite lateral sides of the elongate object, outwardly of the jetting swords 10, to enable first and second parts of a trench to be formed in the seabed, leaving uncut but unsupported seabed material in the space between the first and second parts of the trench. The chain cutters 20 are also provided with second jetting devices 26 (FIGS. 6 and 7) to direct jets of water towards the uncut but unsupported seabed material located between the first and second parts of the trench. A guard 28 is located between the chain cutters 20 and the jetting swords 10 to prevent the elongate object from coming into contact with the teeth 22 of the chain cutters 20. The guard 28 is provided with apertures 30 to enable the second jetting devices 26 to direct jets of water through the guard 28.

An example operation of the apparatus 2 shown in FIGS. 1 to 7 will now be described.

Figure 3:
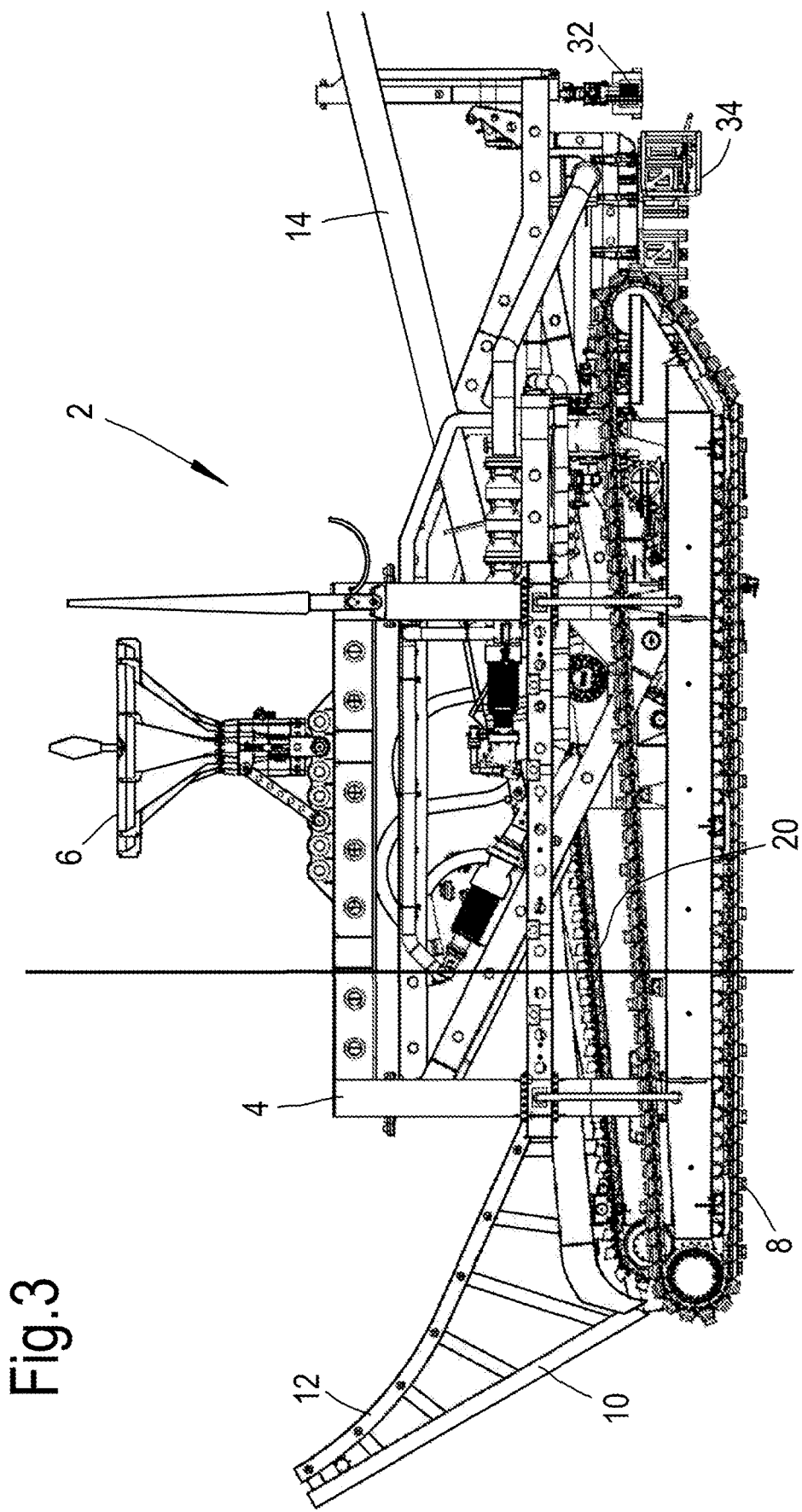
FIG. 3 is a side view of the apparatus of FIG. 1 with the first trench forming device and second trench forming device thereof in the stowed positions.
Figure 4:
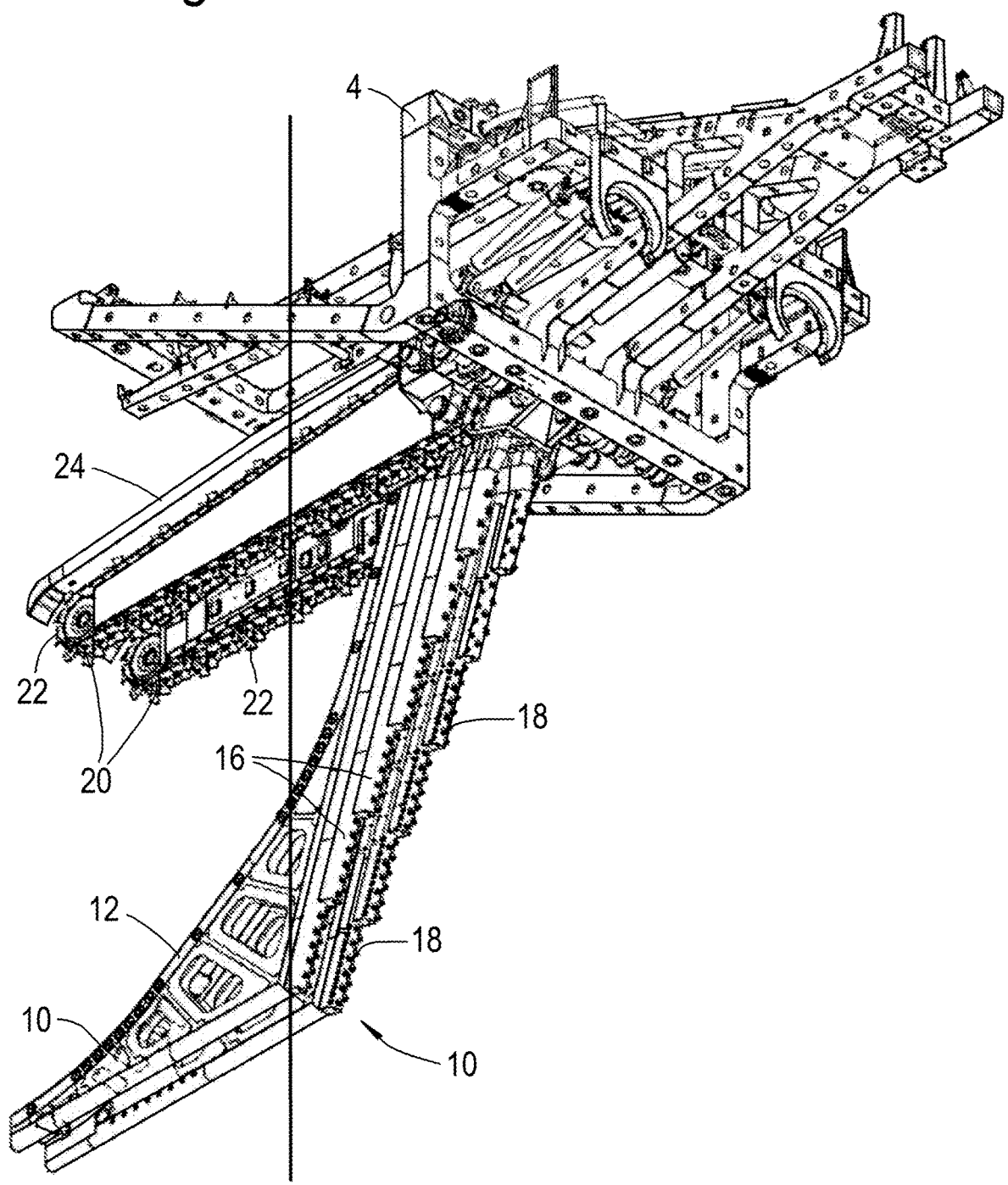
FIG. 4 is a perspective view of part of the apparatus of FIG. 1 showing the first trench forming device in the deployed position and the second trench forming device the stowed position.
Figure 5:
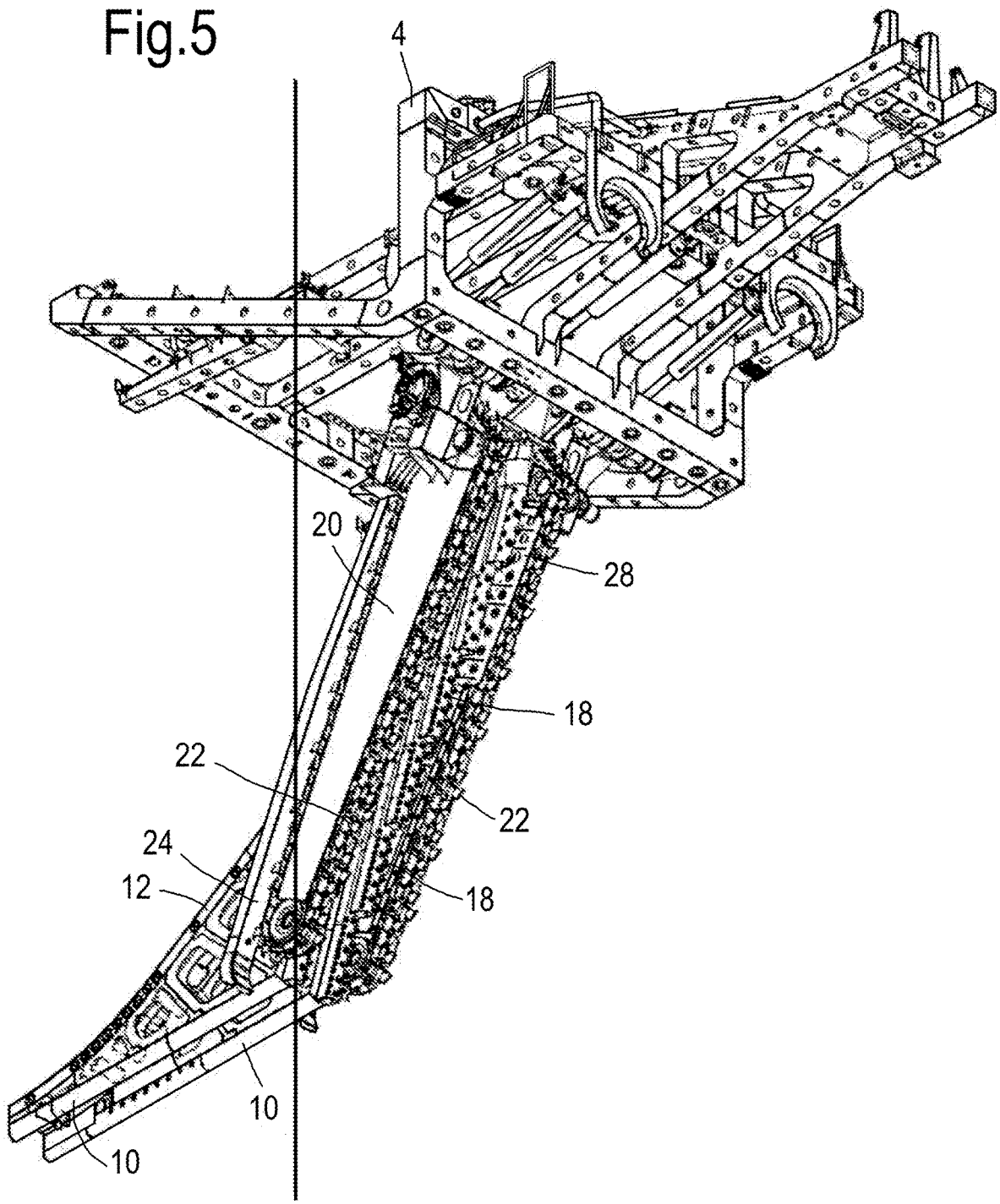
FIG. 5 is a perspective view, corresponding to FIG. 4, with the first trench forming device and the second trench forming device thereof in the deployed positions.
Figure 6:
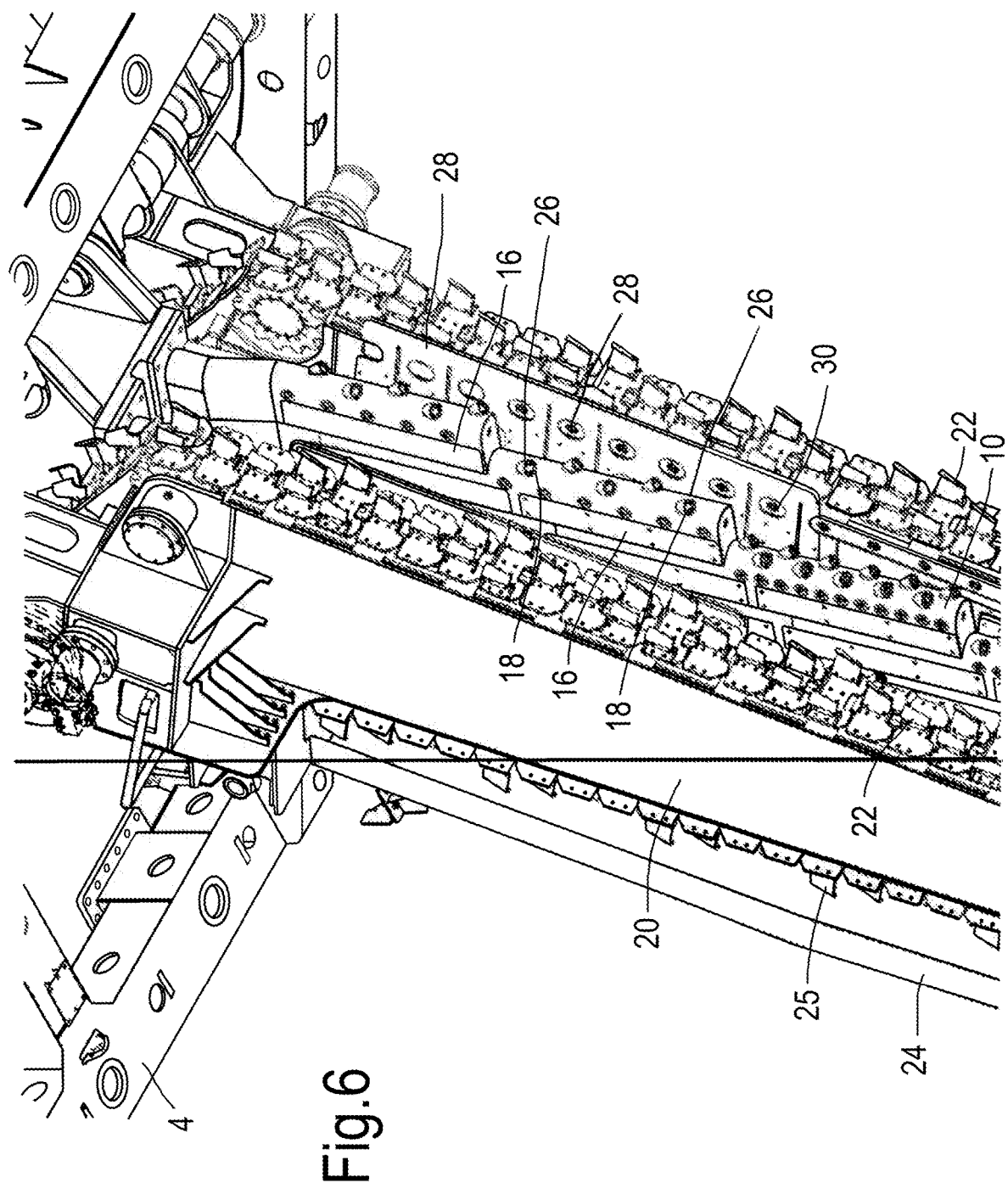
FIG. 6 is a detailed perspective view of part of the apparatus of FIG. 5.

The apparatus 2 is initially lowered from a vessel to the seabed by being supported by the suspension arrangement 6 and with both the first trenching means including the jetting swords 10 and, in some embodiments, the depressor 12, and the second trenching means including the chain cutters 20 in their stowed positions, as shown in FIG. 3. The elongate object in the form of a cable or pipe is then located by means of a grab 32 (FIGS. 1 and 2) located at the front of the body 4, so that the elongate object passes through a bellmouth 34 at the front of the body 4, and extends through the body 4 below the depressor 12 and between the jetting swords 10 and between the chain cutters 20. The apparatus 2 is then driven forwards by means of the tracks 8 and the jetting swords 10 and depressor 12 are then angled downwardly to the desired position, as shown in FIG. 4, while the chain cutters 20 remain in their stowed positions, and the jetting swords 10 are supplied with water via the surface pipe 14 to cause jets of water to be projected forwardly out of the jetting outlets 18 to form a trench in the seabed, into which the depressor 12 pushes the elongate object.

Figure 7:
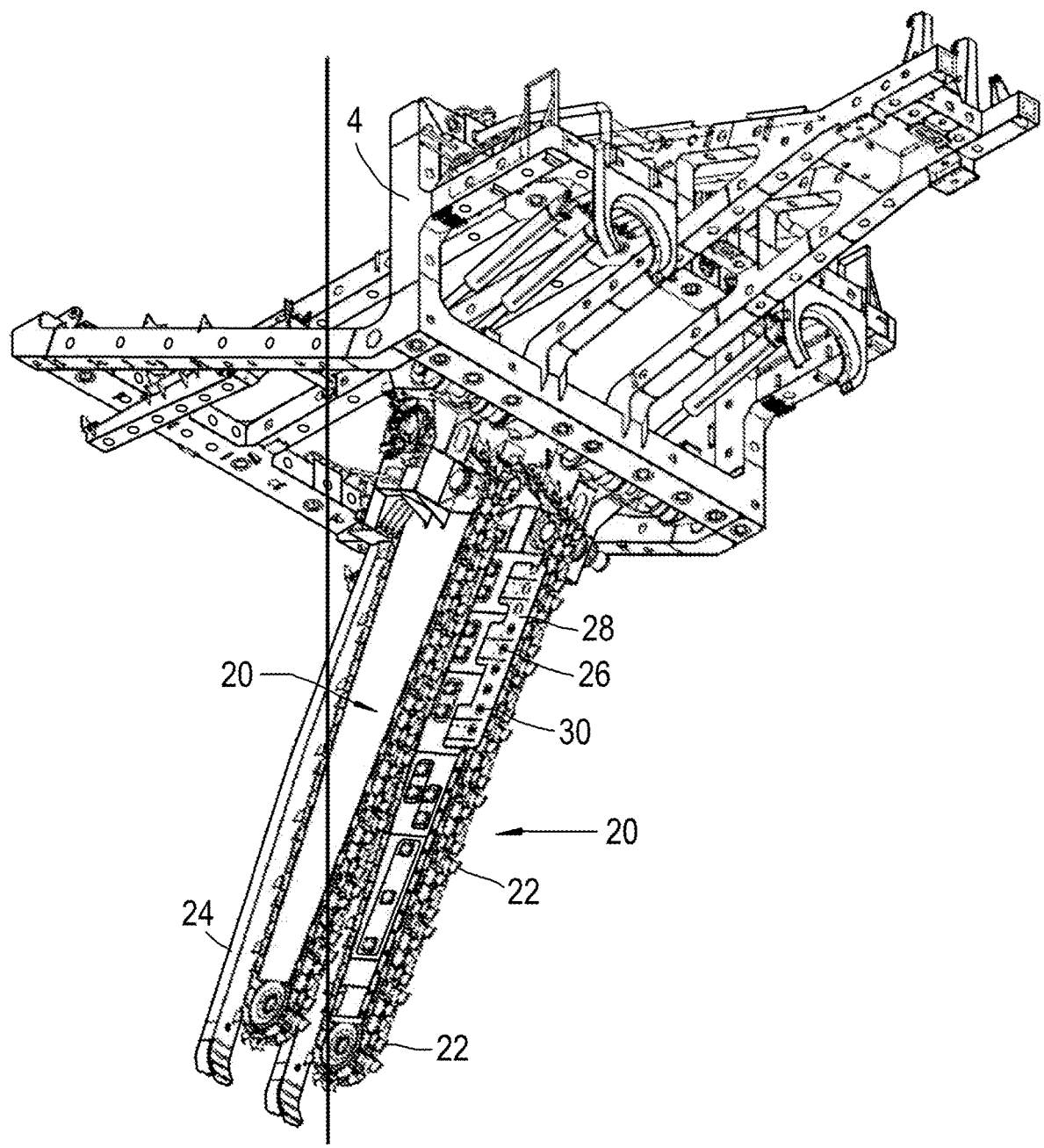
FIG. 7 is a perspective view, corresponding to FIG. 4, with the first trench forming device removed, and the second trench forming device in the deployed position.

When the jetting swords 10 have difficulty progressing due to increases in the ground strength and toughness, which makes jetting less effective, the chain cutters 20 are pivoted downwards as shown in FIGS. 1, 2, 5 and 6. The chain cutters 20 are deployed in advance of the jetting swords 10 to form first and second parts of a trench in the form of two parallel trenches, which destabilizes the central uncut material located between the two parts of the trench, by removing any side support. The second jetting devices 26 direct jets of water inwards to further weaken the uncut seabed material, which is then further broken up by means of the jetting swords 10. Further ground degradation of harder non-jettable layers is achieved by jetting under the harder layers by undercutting the material removing the supporting material. These actions reduce the overall strength of the uncut material in front of the jetting swords 10, thereby improving the jetting progress rates It is also possible to use the apparatus 2 with only the chain cutters 20 deployed, as shown in FIG. 7, if the water jets directed inwards by the second jetting devices 26 have sufficient power to breakup the uncut seabed material.

It will be appreciated by persons skilled in the art that the above embodiment has been described by way of example only and not in any limitative sense, and that various alterations and modifications are possible without departure from the scope of the present disclosure as defined by the appended claims.

The invention claimed is:

1. An apparatus for locating an elongate object in a trench in a floor of a body of water, the apparatus comprising:
   a body;
   a first trench forming device mounted to the body and comprising a respective first jetting device adapted to be arranged on each lateral side of an elongate object and to direct at least one respective jet of liquid to at least partially form a trench in a floor of a body of water;
   a second trench forming device comprising a respective mechanical cutting device adapted to be arranged on each lateral side of the elongate object and to cut a respective part of a trench in the floor of the body of water, wherein the second trench forming device is mounted to the body and is moveable relative to the body between a stowed position, rearwardly a portion of the first trench forming device, and a deployed position, independently of the first trench forming device, and at least one said mechanical cutting device is located forwardly, in a direction of travel of the apparatus, of at least one said first jetting device in the deployed position of the second trench forming device; and
   a guard device adapted to be located between the second trench forming device and the elongate object for preventing the elongate object from coming into contact with the second trench forming device;
   wherein the second trench forming device includes at least one second jetting device adapted to direct at least one respective jet of liquid at material of the floor of the body of water located between the respective parts of said trench formed by the second trench forming device; and
   wherein the guard device includes at least one aperture to enable at least one said second jetting device to direct at least one jet of liquid through said aperture at material of the floor of the body of water located between the respective parts of the trench formed by the second trench forming device.

2. The apparatus according to claim 1, wherein the second trench forming device is pivotable between the stowed and deployed positions.

3. The apparatus according to claim 1, wherein the first trench forming device includes a pressing portion for pressing the elongate object to the trench.

4. The apparatus according to claim 1, wherein the first trench forming device is moveable relative to the body between a stowed position and a deployed position.

5. The apparatus according to claim 4, wherein the second trench forming device is pivotable between the stowed and deployed positions.

6. The apparatus according to claim 1, wherein at least one said first jetting device has a plurality of inlets, and a respective plurality of outlets in fluid communication with each said inlet.

7. The apparatus according to claim 6, wherein the total cross sectional area of the outlets for each of said plurality of outlets is substantially equal.

8. The apparatus according to claim 6, wherein the cross sectional area of each said outlet is substantially equal for each said plurality of outlets and the number of said outlets is substantially equal for each said plurality of outlets.

9. The apparatus according to claim 1, wherein at least one said mechanical cutting device comprises at least one chain cutter.

10. The apparatus according to claim 1, wherein at least one said mechanical cutting device comprises at least one wheel cutter.

11. The apparatus according to claim 1, further comprising a load transferring device for transferring loads transverse to the direction of travel between the first trench cutting device and the corresponding said second trench cutting device.

12. An apparatus for locating an elongate object in a trench in a floor of a body of water, the apparatus comprising:
- a body;
- a first trench forming device mounted to the body and comprising a respective first jetting device adapted to be arranged on each lateral side of an elongate object and to direct at least one respective jet of liquid to at least partially form a trench in a floor of a body of water;
- a second trench forming device comprising a respective mechanical cutting device adapted to be arranged on each lateral side of the elongate object, laterally adjacent the first trench forming device, and to cut a respective part of a trench in the floor of the body of water, wherein the second trench forming device is mounted to the body and is moveable relative to the body between a stowed position and a deployed position, independently of the first trench forming device, and at least one said mechanical cutting device is located forwardly, in a direction of travel of the apparatus, of at least one said jetting device in the deployed position of the second trench forming device; and
- a guard device adapted to be located between the second trench forming device and the elongate object for preventing the elongate object from coming into contact with the second trench forming device;
- wherein the second trench forming device includes at least one second jetting device adapted to direct at least one respective jet of liquid at material of the floor of the body of water located between the respective parts of said trench formed by the second trench forming device; and
- wherein the guard device includes at least one aperture to enable at least one said second jetting device to direct at least one jet of liquid through said aperture at material of the floor of the body of water located between the respective parts of the trench formed by the second trench forming device.

13. The apparatus according to claim 12, wherein a leading edge of the second trench forming device is configured to move from rearward to forward of the first trench forming device as the second trench forming device moves from the stowed position to the deployed position, such that the leading edge of the second trench forming device is deployed in advance of the first trench forming device in the direction of travel.

14. The apparatus according to claim 12, wherein the first trench forming device is arranged between the respective mechanical cutting devices when the second trench forming device is in the deployed position.

15. The apparatus according to claim 14, wherein the first trench forming device is moveable relative to the body between a stowed position and a deployed position.

\* \* \* \* \*